United States Patent
Minami

(10) Patent No.: US 9,821,633 B2
(45) Date of Patent: Nov. 21, 2017

(54) COOLING AND HEATING AIR CONDITIONER

(71) Applicant: Nissan Motor Co., Ltd., Kanagawa (JP)

(72) Inventor: Kenichiro Minami, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/429,269

(22) PCT Filed: Aug. 19, 2013

(86) PCT No.: PCT/JP2013/072055
§ 371 (c)(1),
(2) Date: Mar. 18, 2015

(87) PCT Pub. No.: WO2014/045773
PCT Pub. Date: Mar. 27, 2014

(65) Prior Publication Data
US 2015/0217626 A1     Aug. 6, 2015

(30) Foreign Application Priority Data
Sep. 19, 2012   (JP) ................ 2012-205601

(51) Int. Cl.
*B60H 1/00* (2006.01)

(52) U.S. Cl.
CPC ..... *B60H 1/00964* (2013.01); *B60H 1/00657* (2013.01); *B60H 1/00985* (2013.01)

(58) Field of Classification Search
CPC .............. B60H 1/00964; B60H 1/0065; B60H 1/00657; B60H 1/00985; B60K 37/06
(Continued)

(56) References Cited

U.S. PATENT DOCUMENTS 4,383,574 A * 5/1983 Yoshioka ........... B60H 1/00835
                                                                165/269
4,486,837 A * 12/1984 Kojima .............. B60H 1/00964
                                                                165/42
(Continued)

FOREIGN PATENT DOCUMENTS

CN           101870241 A        10/2010
JP           61-271112 A        12/1986
(Continued)

OTHER PUBLICATIONS

International Search Report issued in PCT/JP2013/072055, dated Sep. 17, 2013 (2 pages).
(Continued)

*Primary Examiner* — Frantz Jules
*Assistant Examiner* — Nelson Nieves
(74) *Attorney, Agent, or Firm* — Osha Liang LLP

(57) ABSTRACT

A cooling and heating air conditioner installed in an electric vehicle, having a cooling and heating air conditioning unit including a cooling device that produces cooled air, and a heating device that produces heated air, wherein the cooling and heating air conditioning unit sends the cooled air produced by the cooling device or the heated air produced by the heating device to a vehicle interior, a cooling and heating air conditioning controller that sets the cooling and heating air conditioning unit to a cooling mode for sending the cooled air produced by the cooling device, a heating mode for sending the heated air produced by the heating device, or an AUTO mode for automatically selecting the cooling mode or the heating mode at least based on a temperature of the vehicle interior so as to control the cooling and heating air conditioning unit according to a set mode.

7 Claims, 6 Drawing Sheets

(58) Field of Classification Search
USPC .................................................... 165/202
See application file for complete search history.

(56) References Cited

U.S. PATENT DOCUMENTS

| | | | | |
|---|---|---|---|---|
| 5,220,805 | A * | 6/1993 | Fukudomi | B60H 1/00964 165/42 |
| 5,244,035 | A * | 9/1993 | Iida | B60H 1/00742 165/202 |
| 5,299,431 | A * | 4/1994 | Iritani | B60H 1/00914 62/159 |
| 5,595,064 | A * | 1/1997 | Ikeda | B60H 1/3222 180/65.1 |
| 5,704,217 | A | 1/1998 | Itoh et al. | |
| 5,706,664 | A * | 1/1998 | Hara | B60H 1/00314 165/240 |
| 5,954,577 | A * | 9/1999 | Meckler | B60H 3/0625 454/158 |
| 6,009,355 | A * | 12/1999 | Obradovich | B60H 1/00985 340/815.4 |
| 6,076,593 | A * | 6/2000 | Takagi | B60H 1/00914 165/202 |
| 6,430,951 | B1 * | 8/2002 | Iritani | B60H 1/00914 62/160 |
| 8,442,752 | B2 | 5/2013 | Wijaya et al. | |
| 2001/0035286 | A1 * | 11/2001 | Kobayashi | B60H 1/3207 165/202 |
| 2003/0057768 | A1 | 3/2003 | Liao et al. | |
| 2008/0264079 | A1 * | 10/2008 | Takenaka | B60H 1/00985 62/127 |
| 2009/0024252 | A1 * | 1/2009 | Aridome | B60K 6/445 700/275 |
| 2009/0071393 | A1 * | 3/2009 | Takenaka | G01D 13/10 116/291 |
| 2010/0050075 | A1 * | 2/2010 | Thorson | B60H 1/00985 715/702 |
| 2010/0274394 | A1 | 10/2010 | Wijaya et al. | |
| 2013/0271074 | A1 * | 10/2013 | Federico | G06F 7/00 320/109 |
| 2014/0034266 | A1 * | 2/2014 | Tabei | B60H 1/00764 165/42 |

FOREIGN PATENT DOCUMENTS

| | | |
|---|---|---|
| JP | 06-227246 A | 8/1994 |
| JP | 8-156572 A | 6/1996 |
| JP | 9-142139 A | 6/1997 |
| JP | 2000-238522 A | 9/2000 |
| JP | 2001-328486 A | 11/2001 |
| JP | 2002-144850 A | 5/2002 |
| JP | 2002-347433 A | 12/2002 |
| JP | 2011-152808 A | 8/2011 |
| JP | 2012-096707 A | 5/2012 |
| JP | 2012-153236 A | 8/2012 |
| WO | WO 2011152187 A1 * 12/2011 ......... B60H 1/00849 |

OTHER PUBLICATIONS

Written Opinion issued in PCT/JP2013/072055, dated Sep. 17, 2013 (4 pages).
International Preliminary Report on Patentability issued in PCT/JP2013/072055, dated Mar. 17, 2014 (8 pages).

* cited by examiner

COOLING AND HEATING AIR CONDITIONER

CROSS-REFERENCE TO RELATED APPLICATIONS

The present application is a national stage application of PCT Application No. PCT/JP2013/072055 filed Aug. 19, 2013, which claims foreign priority to Japanese Patent Application No. P2012-205601 filed on Sep. 19, 2012, the contents of which are hereby incorporated by reference in their entirety.

BACKGROUND

Technical Field

The present invention relates to cooling and heating air conditioners for vehicles.

Related Art

For example, there is provided a cooling and heating air conditioner for a vehicle including an air conditioning switch for selecting a cooling mode, an auto-mode switch for selecting an automatic mode, and a display for displaying set conditions of the respective modes (refer to Patent Literature 1).

CITATION LIST

Patent Literature

Patent Literature 1: Japanese Unexamined Patent Application Publication No. 2012-096707

SUMMARY

In the device described in Patent Literature 1 that a user cannot recognize how much energy is consumed during the operation of the cooling and heating air conditioner when the cooling and heating air conditioner is set to the automatic mode.

One or more embodiments of the present invention provides a cooling and heating air conditioner enabling a user to intuitionally recognize energy consumption.

A cooling and heating air conditioner according to one or more embodiments of the present invention comprises a cooling and heating air conditioning unit, a cooling and heating air conditioning controller, an air conditioning setting portion, a heater setting portion, an AUTO setting portion, an air conditioning indicator, and a heater indicator. The cooling and heating air conditioning unit includes a cooling device for producing cooled air and a heating device for producing heated air, and sends the cooled air produced by the cooling device or the heated air produced by the heating device to a vehicle interior. The cooling and heating air conditioning controller sets the cooling and heating air conditioning unit to a cooling mode for sending the cooled air produced by the cooling device, a heating mode for sending the heated air produced by the heating device or an AUTO mode for automatically selecting the cooling mode or the heating mode at least based on a temperature of the vehicle interior so as to control the cooling and heating air conditioning unit according to the set mode. The air conditioning setting portion sets the cooling and heating air conditioning controller to the cooling mode. The heater setting portion sets the cooling and heating air conditioning controller to the heating mode. The AUTO setting portion sets the cooling and heating air conditioning controller to the AUTO mode. The air conditioning indicator indicates an activated state of the cooling device. The heater indicator indicates an activated state of the heating device. The cooling and heating air conditioning controller directs the air conditioning indicator or the heater indicator to indicate the activated state of the cooling device or the heating device when the AUTO mode is selected by the AUTO setting portion.

A method of controlling a cooling and heating air conditioner according to one or more embodiments of the present invention comprises a cooling and heating air conditioning unit, an air conditioning setting portion, a heater setting portion, an AUTO setting portion, an air conditioning indicator, and a heater indicator, the method including setting the cooling and heating air conditioning unit to a cooling mode, a heating mode or an AUTO mode so as to control the cooling and heating air conditioning unit according to the set mode, and directing the air conditioning indicator or the heater indicator to indicate an activated state of a cooling device or a heating device when the AUTO mode is selected by the AUTO setting portion. The cooling and heating air conditioning unit sends cooled air produced by the cooling device or heated air produced by the heating device to a vehicle interior. The air conditioning setting portion sets a cooling and heating air conditioning controller to the cooling mode. The heater setting portion sets the cooling and heating air conditioning controller to the heating mode. The AUTO setting portion sets the cooling and heating air conditioning controller to the AUTO mode. The air conditioning indicator indicates the activated state of the cooling device. The heater indicator indicates the activated state of the heating device.

DETAILED DESCRIPTION

Figure 1:
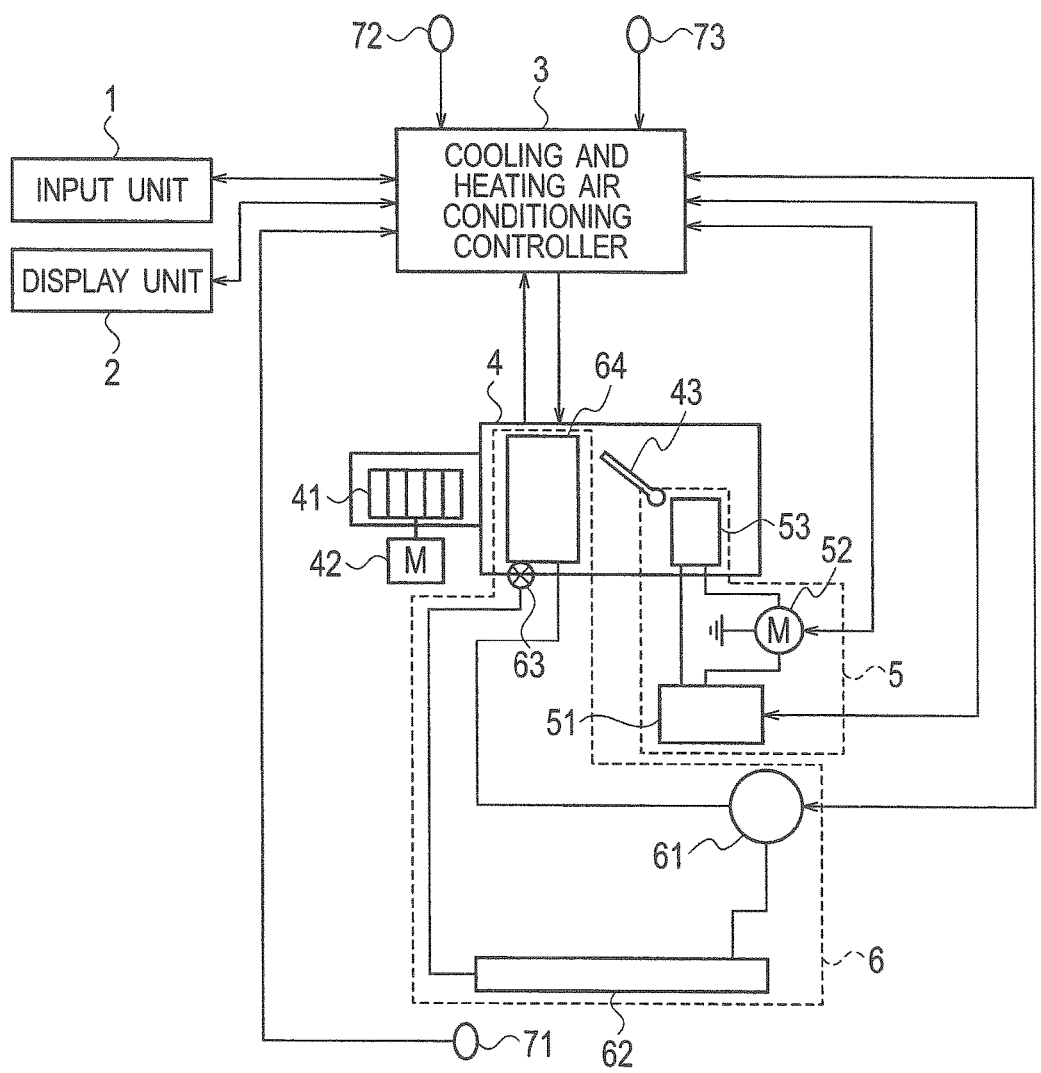
FIG. 1 is a schematic block diagram for explaining a fundamental configuration of a cooling and heating air conditioner according to one or more embodiments of the present invention.

Hereinafter, embodiments of the present invention will be explained with reference to the drawings. In the following explanations of the drawings, the same or similar elements are indicated by the same or similar reference numerals. It should be noted that each embodiment described below are examples of the present invention, but the invention is not limited thereto. The scope of the present invention includes various modifications. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Cooling and Heating Air Conditioner)

As shown in FIG. 1, a cooling and heating air conditioner according to one or more embodiments of the present invention includes an input unit 1, a display unit 2, a cooling and heating air conditioning controller 3, and a cooling and heating air conditioning unit 4. The cooling and heating air conditioner according to one or more embodiments of the present invention is, for example, installed in an electric vehicle to regulate aerial conditions in the vehicle interior.

The cooling and heating air conditioning unit 4 includes a heating device 5 activated by electric energy so as to produce heated air, and a cooling device 6 activated by electric energy so as to produce cooled air. The cooling and heating air conditioning unit 4 further includes a blower fan 41 for sending air to the vehicle interior, a motor 42 for driving the blower fan 41, and an air mix door 43 for regulating the ratio of the cooled air produced by the cooling device 6 and the heated air produced by the heating device 5. The cooling and heating air conditioning unit 4 adjusts the respective amounts of the cooled air produced by the cooling device 6 and the heated air produced by the heating device 5 to send the adjusted air to the vehicle interior.

The heating device 5 includes a heater 51 for converting the electric energy into heat, a pump 52 for transmitting the heat converted by the heater 51, and a heater core 53 for releasing the heat transmitted from the heater 51 by the pump 52 to produce the heated air. The heater 51 is, for example, a positive temperature coefficient (PTC) heater in which a resistive value increases as a temperature increases.

The cooling device 6 includes a compressor 61 for compressing a coolant, a condenser 62 for condensing the coolant compressed by the compressor 61, an expansion valve 63 for expanding the coolant condensed by the condenser 62, and an evaporator 64 for evaporating the coolant expanded by the expansion valve 63 to produce the cooled air. The evaporator 64 functions as an indoor heat exchanger.

Figure 2:
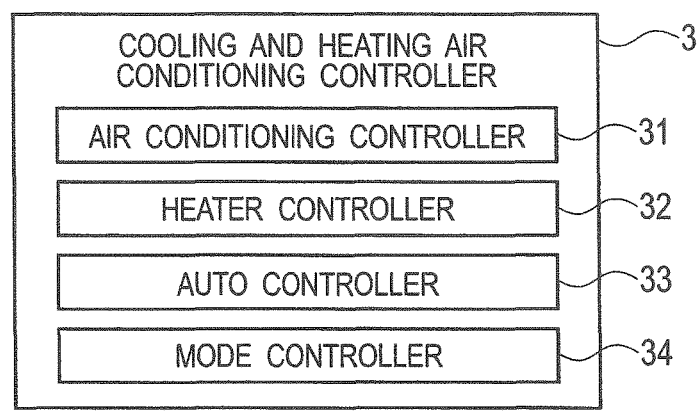
FIG. 2 is a block diagram for explaining a cooling and heating air conditioning controller equipped in the cooling and heating air conditioner according to one or more embodiments of the present invention.

As shown in FIG. 2, the cooling and heating air conditioning controller 3 includes, as a logical structure, an air conditioning controller 31 for controlling the cooling device 6, a heater controller 32 for controlling the heating device 5, an AUTO controller 33 and a mode controller 34, and controls the cooling and heating air conditioning unit 4 in a set mode. The mode controller 34 controls a plurality of doors (not shown in the figure) to open or close a plurality of blow nozzles through which the cooling and heating air conditioning unit 4 sends the air to the vehicle interior.

The cooling and heating air conditioning controller 3 can set the cooling and heating air conditioning unit 4 to a cooling mode for primarily sending the cooled air produced by the cooling device 6 or a heating mode for primarily sending the heated air produced by the heating device 5.

The cooling and heating air conditioning controller 3 can also select an AUTO mode for automatically selecting the cooling mode or the heating mode at least based on the temperature of the vehicle interior, in addition to the cooling mode and the heating mode. When the cooling and heating air conditioning controller 3 selects the AUTO mode, the AUTO controller 33 carries out the processing for the AUTO mode. The cooling and heating air conditioning controller 3 can select any of the cooling mode, the heating mode and the AUTO mode.

The cooling and heating air conditioner according to one or more embodiments of the present invention includes an outside temperature sensor 71 for detecting a temperature outside the vehicle, an interior temperature sensor 72 for detecting a temperature of the vehicle interior, and a solar radiation sensor 73 for detecting the amount of solar radiation. The cooling and heating air conditioning controller 3 calculates a target blowing temperature based on the temperatures detected by the outside temperature sensor 71 and the interior temperature sensor 72 and the amount of solar radiation detected by the solar radiation sensor 73.

The AUTO controller 33 automatically sets the cooling and heating air conditioning unit 4 to the cooling mode or the heating mode at least based on the temperature detected by the inside temperature sensor 72. The AUTO controller 33 subtracts the outside temperature from the target blowing temperature and determines whether the obtained value is larger than a predetermined threshold value having hysteresis. The AUTO controller 33 selects the heating mode when the obtained value is larger than the threshold value and selects the cooling mode when the obtained value is smaller than the threshold value. The AUTO controller 33 can also automatically set the cooling and heating air conditioning unit 4 to the cooling mode or the heating mode depending on the temperature detected by the interior temperature sensor 72 and the amount of solar radiation detected by the solar radiation sensor 73.

Figure 3:
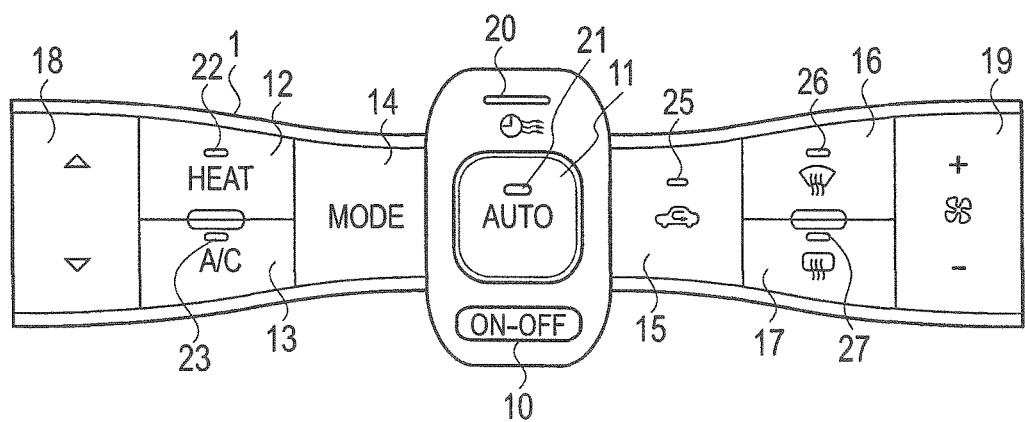
FIG. 3 is a view for explaining an input unit (a switch panel) equipped in the cooling and heating air conditioner according to one or more embodiments of the present invention.

The input unit 1 includes an input device including switches that output signals in accordance with the operation by the user to the cooling and heating air conditioning controller 3. The input unit 1 according to one or more embodiments of the present invention is explained below as a switch panel 1 as shown in FIG. 3.

The switch panel 1 includes an AUTO switch (an AUTO setting portion) 11, a heater switch (a heater setting portion) 12 and an air conditioning switch (an air conditioning setting portion) 13. The AUTO switch 11 is a switch (a setting portion) for setting the cooling and heating air conditioning controller 3 to the AUTO mode. The heater switch 12 is a switch for setting the cooling and heating air conditioning controller 3 to the heating mode. In the switch panel 1, the heater switch 12 is located on the upper side of the air conditioning switch 13. The air conditioning switch 13 is a switch for setting the cooling and heating air conditioning controller 3 to the cooling mode.

The switch panel 1 further includes a mode switch 14, an inside/outside air exchange switch 15, a defroster switch 16, a defogger switch 17, a temperature adjustment switch 18, an airflow volume adjustment switch 19 and an ON/OFF switch 10.

The mode switch 14 is a switch for controlling the mode controller 34 to drive the plural doors to open and close the plural blow nozzles. The inside/outside air exchange switch 15 is a switch for controlling the blower fan 41 to switch between the intake from the inside of the vehicle and the intake from the outside of the vehicle. The defroster switch 16 is a switch for controlling, via the cooling and heating air conditioning controller 3, the cooling and heating air conditioning unit 4 to send air to the windshield of the vehicle. The defogger switch 17 is a switch for activating a defogger to clear fog from the rear glass of the vehicle.

The temperature adjustment switch 18 is a switch for adjusting the set temperature of each of the heating device 5 and the cooling device 6. The set temperature of each of the heating device 5 and the cooling device 6 increases when the upper portion of the temperature adjustment switch 18 ("Δ" mark) is pushed, and the set temperature of each of the heating device 5 and the cooling device 6 decreases when the lower portion of the temperature adjustment switch 18 ("∇" mark) is pushed. The temperature adjustment switch 18 is located adjacent to the heater switch 12 and the air conditioning switch 13. These switches are gathered in one area because the set temperature adjusting function and the cooling and heating switching function are similar to each other. The set temperature increase portion of the set temperature adjustment switch 18 and the heater switch 12 each functioning to heat air are aligned on the upper side, and the set temperature decrease portion of the set temperature adjustment switch 18 and the air conditioning switch 13 each functioning to cool air are aligned on the lower side, so as to enable a user to easily recognize those functions intuitionally. The airflow volume adjustment switch 19 is a switch for adjusting the airflow volume sent from the blower fan 41. The ON/OFF switch 10 is a switch for switching between the ON state and the OFF state of operation of the cooling and heating air conditioning unit 4.

The display 2 includes an AUTO indicator 21 for indicating a set state of the AUTO mode, a heater indicator 22 for indicating an activated state of the heater device 5, and an air conditioning indicator 23 for indicating an activated state of the cooling device 6. The AUTO indicator 21, the heater indicator 22 and the air conditioning indicator 23 are each an indicator light of, for example, an LED. The AUTO indicator 21, the heater indicator 22 and the air conditioning indicator 23 are integrated with the AUTO switch 11, the heater switch 12 and the air conditioning switch 13, respectively.

The AUTO indicator 21 indicates that the AUTO mode is selected when being lit and indicates that the AUTO mode is not selected when not being lit. The heater indicator 22 indicates that the heating device 5 is active when being lit and indicates that the heating device 5 is not active when not being lit. Similarly, the air conditioning indicator 23 indicates that the cooling device 6 is active when being lit and indicates that the cooling device 6 is not active when not being lit.

The display 2 further includes an inside/outside air indicator 25, a defroster indicator 26, a defogger indicator 27 and an ON/OFF indicator 20. The inside/outside air indicator 25, the defroster indicator 26, the defogger indicator 27 and the ON/OFF indicator 20 are each an indicator light of, for example, an LED. The inside/outside air indicator 25, the defroster indicator 26 and the defogger indicator 27 are integrated with the inside/outside air exchange switch 15, the defroster switch 16 and the defogger switch 17, respectively.

The inside/outside air indicator 25 indicates that the blower fan 41 is introducing air from the inside of the vehicle when being lit and indicates that the blower fan 41 is introducing air from the outside of the vehicle when not being lit. The defroster switch 16 indicates that the cooling and heating air conditioning unit 4 is sending air to the windshield of the vehicle when being lit and indicates that the cooling and heating air conditioning unit 4 is not sending air to the windshield of the vehicle when not being lit. The defogger switch 17 indicates that the defogger is active when being lit and indicates that the defogger is not active when not being lit. The ON/OFF indicator 20 indicates that the cooling and heating air conditioning unit 4 is active when being lit and indicates that the cooling and heating air conditioning unit 4 is not active when not being lit.

The display 2 further includes a display device (not shown in the figure) that can display the ON/OFF state, the set temperature, the set airflow volume and the like of the cooling and heating air conditioning unit 4 controlled by the cooling and heating air conditioning controller 3.

Figure 4:
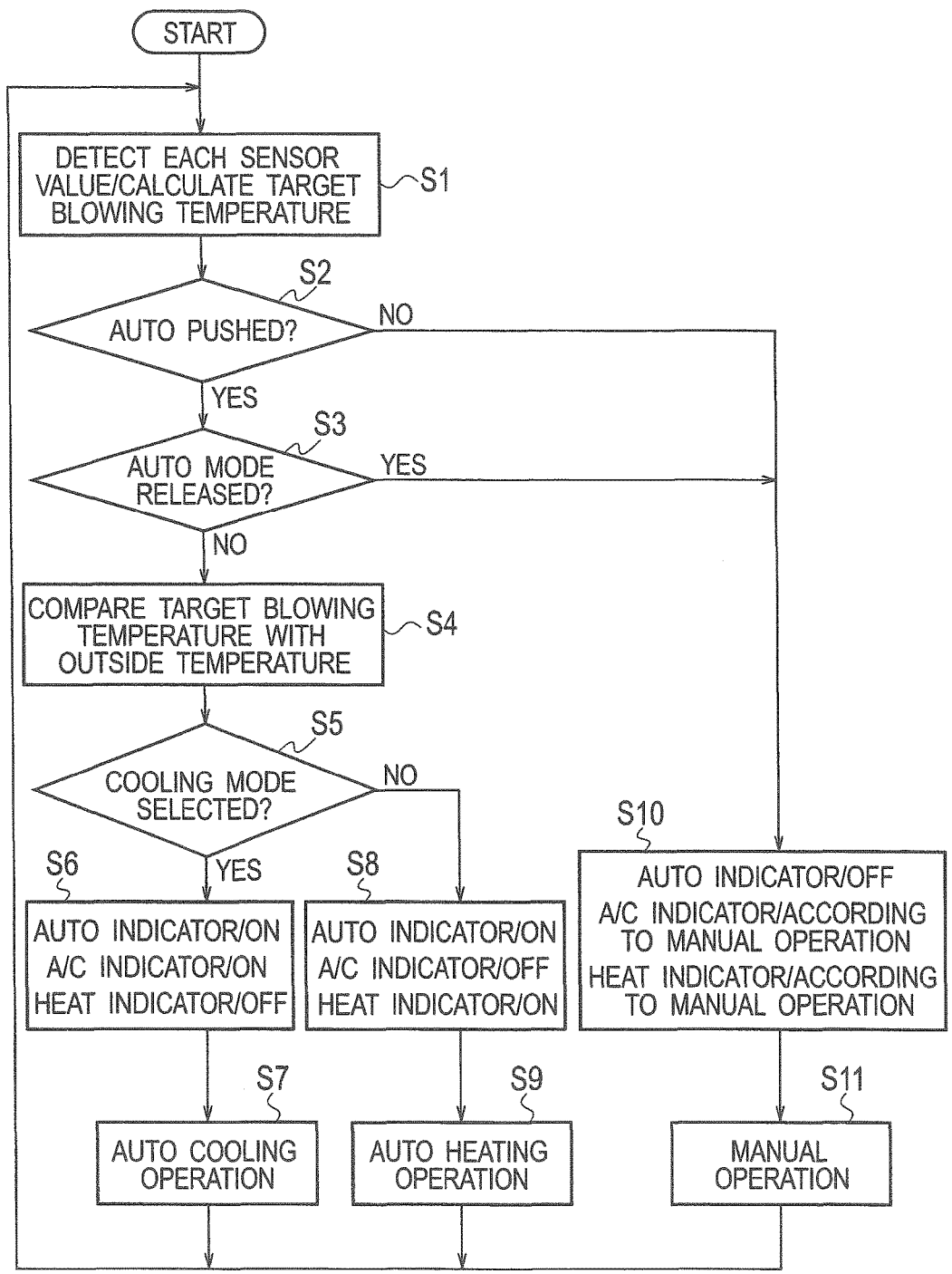
FIG. 4 is a flow chart for explaining an operation of the cooling and heating air conditioner according to one or more embodiments of the present invention.

An example of the operation of the cooling and heating air conditioner according to one or more embodiments of the present invention is explained below by reference to the flowchart shown in FIG. 4.

First, in step S1, the cooling and heating air conditioning controller 3 calculates a target blowing temperature based on a set temperature, temperatures detected by the outside temperature sensor 71 and the interior temperature sensor 72 and the amount of solar radiation detected by the solar radiation sensor 73.

In step S2, the cooling and heating air conditioning controller 3 is set to the AUTO mode when the AUTO switch 11 is pushed. In step S3, the process proceeds to step S4 when a switch to release the AUTO mode is not pushed. The process proceeds to step S10 when the AUTO switch 11 is not pushed in step S2 or when the AUTO mode is released in step S3.

In step S4, the AUTO controller 33 subtracts an outside temperature from the target blowing temperature calculated in step S1 and determines in step S5 whether the obtained value is larger than a predetermined threshold value having hysteresis. The AUTO controller 33 selects the cooling mode when the obtained value is smaller than the threshold value so as to proceed to step S6, and selects the heating mode when the obtained value is larger than the threshold value so as to proceed to step S8.

In step S6, the cooling and heating air conditioning controller 3 is set to the cooling mode by the AUTO controller 33 while being set to the AUTO mode. Namely, the cooling device 6 is activated so that the cooling and heating air conditioning unit 4 sends cooled air to the vehicle interior in step S7 while the AUTO indicator 21 is lit, the air conditioning indicator 23 is lit, and the heater indicator 22 is turned off.

In step S8, the cooling and heating air conditioning controller 3 is set to the heating mode by the AUTO controller 33 while being set to the AUTO mode. Namely, the heating device 5 is activated so that the cooling and heating air conditioning unit 4 sends heated air to the vehicle interior in step S9 while the AUTO indicator 21 is lit, the air conditioning indicator 23 is turned off, and the heater indicator 22 is lit.

In step 10, the cooling and heating air conditioning controller 3 is set to not the AUTO mode but a manual mode. Thus, the AUTO indicator 21 is turned off, and the air conditioning indicator 23 and the heater indicator 22 each indicate a state depending on the operation by the user. For example, when the heating device 5 is active in the AUTO mode and once the airflow volume adjustment switch 19 is pushed, the heater display 22 remains lit while the AUTO indicator 21 is turned off. The cooling and heating air conditioning controller 3 can be kept in the last activated state when the AUTO mode is released.

Figure 5:
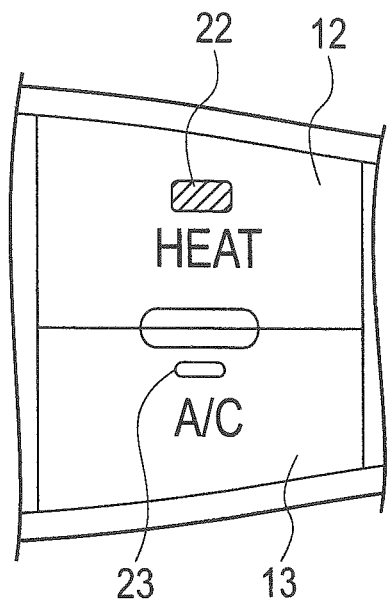
FIG. 5 is a view for explaining operations of the input unit and a display unit equipped in the cooling and heating air conditioner according to one or more embodiments of the present invention.

In the cooling and heating air conditioner according to one or more embodiments of the present invention, when the AUTO switch is pushed in winter so that the cooling and heating air conditioning controller 3 is set to the AUTO mode, the heating mode is automatically selected so that the heating device 5 is activated. Thus, as shown in FIG. 5, the display 2 is in a state where the heater indicator 22 is lit, which indicates that the heating device 5 is active.

Figure 6:
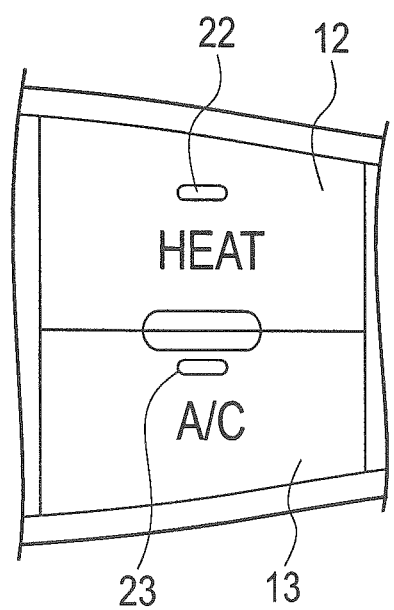
FIG. 6 is a view for explaining the operations of the input unit and the display unit equipped in the cooling and heating air conditioner according to one or more embodiments of the present invention.

In the state described above, when the heater switch 12 is pushed, the heater indicator 22 is turned off as shown in FIG. 6 so that the heating device 5 stops operating. Thus, when the cooling and heating air conditioning controller 3 activates the cooling and heating air conditioning unit 4 while neither the cooling mode nor the heating mode is selected, the cooling and heating air conditioning unit 4 is put into ventilation operation only by use of the blower fan 41, which is driven at a low voltage. Since the heater indicator 22 and the air conditioning indicator 23 are both turned off, and the heating device 5 and the cooling device 6 each being driven at a high voltage both stop operating, the user can intuitionally recognize that the consumption of electric energy is low.

Figure 7:
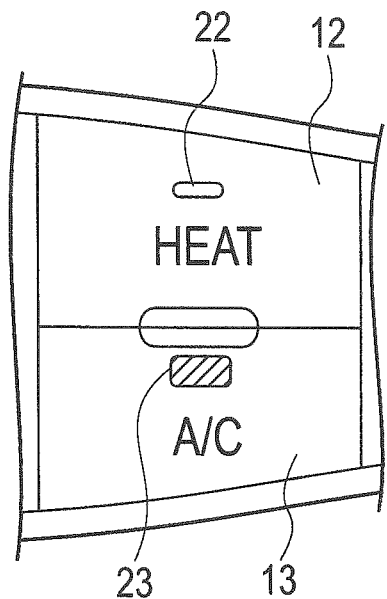
FIG. 7 is a view for explaining the operations of the input unit and the display unit equipped in the cooling and heating air conditioner according to one or more embodiments of the present invention.

When the cooling mode is selected in the AUTO mode in summer, the display 2 indicates that the air conditioning indicator 23 is lit, as shown in FIG. 7, which indicates that the cooling device 6 is active. In such a state, when the air conditioning switch 13 is pushed, the cooling and heating air conditioning unit 4 is put into ventilation operation only by use of the blower fan 41 in the same manner as described above.

When the cooling and heating air conditioning unit 4 is in ventilation operation, the cooling and heating air conditioning controller 3 is set to the heating mode in the manual mode once the heater switch 12 is pushed, and is set to the cooling mode in the manual mode once the air conditioning switch 13 is pushed. The cooling and heating air conditioning controller 3 is set to the AUTO mode once the AUTO switch 11 is pushed.

Figure 8:
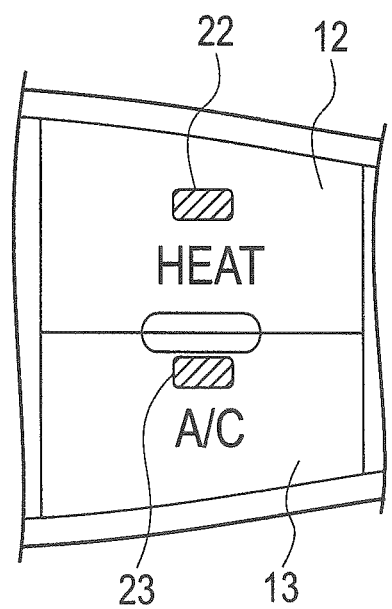
FIG. 8 is a view for explaining the operations of the input unit and the display unit equipped in the cooling and heating air conditioner according to one or more embodiments of the present invention.

As shown in FIG. 8, when the heater switch 12 and the air conditioning switch 13 are pushed, and the heater indicator 22 and the air conditioning indicator 23 are both lit, the cooling and heating air conditioning controller 3 is released from the AUTO mode and is then set to the cooling mode and the heating mode concurrently. In such a case, the cooling and heating air conditioning unit 4 is put into dehumidification operation.

In the dehumidification operation, moisture in the air introduced by the cooling and heating air conditioning controller 3 is condensed by the cooling device 6, and the cooled and dehumidified air is then heated by the heating device 5 approximately to a temperature around the blow nozzles so as to be sent into the vehicle interior. The dehumidification operation is carried out, generally in winter when the windows tend to fog up, once the air conditioning switch 13 is pushed while the cooling and heating air conditioning unit 4 is active in the heating mode.

The dehumidification operation consumes a large amount of electric energy since both the heating device 5 and the cooling device 6 are activated. Here, the AUTO mode is released also when the defroster switch 16 is pushed so that the cooling and heating air conditioning unit 4 carries out the dehumidification operation.

In general, heating devices installed in vehicles such as electric vehicles using energy sources other than waste heat from engines are activated by electric energy from batteries for driving. In the conventional case, when the cooling and heating air conditioner was activated in the automatic mode, and if the activated state of the cooling device could only be recognized, the user could not recognize how much electric energy was consumed. In general, a traveling distance (an available driving distance without resupply of an energy source) of an electric vehicle is shorter than that of a gasoline vehicle. This may make the user nervous about the consumption of the electric energy, which may lead to a case where the user intentionally stops cooling/heating the vehicle interior even at a temperature required to be cooled/heated in order to extend the traveling distance of the vehicle.

The cooling and heating air conditioner according to one or more embodiments of the present invention includes the heater indicator 22 for indicating the activated state of the heating device 5. When the AUTO mode is selected by the AUTO setting portion 11, the air conditioning indicator 23 or the heater indicator 22 indicates the activated state of the cooling device or the heating device. Since the user can recognize the activated state of the cooling device 6 or the heating device 5 even when the cooling and heating air conditioner is activated in the AUTO mode, the user can intuitionally recognize the energy consumption of the cooling and heating air conditioner. Further, the cooling and heating air conditioner according to one or more embodiments of the present invention includes the heater switch 12 for activating the heating device 5 so as to control the heating device 5 manually.

Further, in the cooling and heating air conditioner according to one or more embodiments of the present invention, the air conditioning indicator 23 and the heater indicator 22 are integrated with the air conditioning switch 13 and the heater switch 12, respectively. Since the display means operated by the user shows the reaction, the user can recognize the energy consumption more intuitionally.

Further, the cooling and heating air conditioner according to one or more embodiments of the present invention implements the ventilation operation when neither the cooling mode nor the heating mode is selected. Since both the heating energy and the cooling energy are stopped, the user can intuitionally recognize that the cooling and heating air conditioning unit 4 is activated by energy at a low voltage.

Further, the cooling and heating air conditioner according to one or more embodiments of the present invention implements the dehumidification operation when both the cooling mode and the heating mode are selected. Since the two indicator lights (indicators) are lit during the dehumidification operation, the user can intuitionally recognize the cooling and heating air conditioner is in the drive mode using a large amount of air conditioning energy including both the heating energy and the cooling energy.

Further, in the cooling and heating air conditioner according to one or more embodiments of the present invention, the heater switch 12 for heating is located on the upper side in the switch panel 1, and the air conditioning switch 13 for cooling is located on the lower side. Since the heater switch and the air conditioning switch are arranged at the positions which meet the psychology of people that, in general, an upper switch is used when intending to increase a set temperature (to heat) and a lower switch is used when intending to decrease a set temperature (to cool), the user can intuitionally operate the cooling and heating air conditioner. In addition, since the temperature adjustment switch 18 is located adjacent to the heater switch and the air conditioning switch, in which the set temperature increase switch is located on the upper side and the set temperature decrease switch is located on the lower side, the user can intuitionally operate the cooling and heating air conditioner.

Further, the cooling and heating air conditioner according to one or more embodiments of the present invention is installed in the electric vehicle so that the user can intuitionally recognize the energy consumption which has an influence on a traveling distance of the vehicle.

Other Embodiments

Although embodiments are described above as examples, the present invention should not be deemed to be limited to the descriptions and the drawings composing part of the disclosure. It will be apparent to those skilled in the art from the disclosure that various alternative embodiments, examples and implementations can be made.

In one or more of the embodiments described above, the heating device 5 is not necessarily the PTC heater as long as it is a system for heating by electric energy. The heating device 5 may be any heating devices of other systems such as a heater for directly heating air inside the cooling and heating air conditioning unit 4 or an inner capacitor in a heat pump system.

Figure 9:
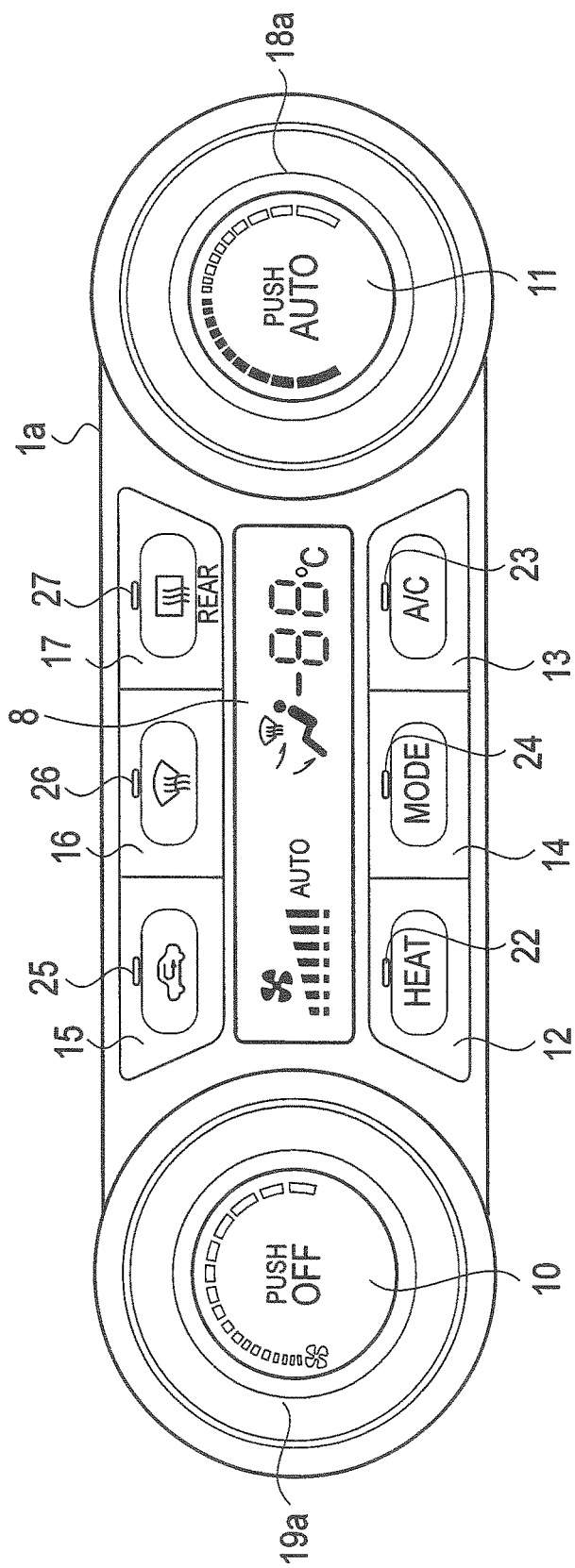
FIG. 9 is a view for explaining an input unit (a switch panel) equipped in a cooling and heating air conditioner according to one or more embodiments of the present invention.

Further, in one or more of the embodiments described above, the input unit 1 may be a switch panel 1*a* as shown in FIG. 9. The switch panel 1*a* differs from the switch panel 1 in that the switch panel 1*a* includes a display device 8, a temperature adjustment dial 18*a* and an airflow adjustment dial 19*a*. Other configurations of the switch panel 1*a* not described below are the same as those of the switch panel 1 and therefore, overlapping explanations thereof are not repeated. The display device 8 can serve as the display unit 2 and is, for example, a liquid crystal display panel. The display device 8 can display the position of blow nozzles moving in association with the mode switch 14, display whether the AUTO mode is selected, display the set airflow volume and the set temperature, and the like. Alternatively, as the display unit 2, various display means used in the vehicle interior such as a display of a car navigation device or a display of a smartphone or a mobile phone may be employed.

The present invention can, of course, include various embodiments not described in this specification. Therefore, the scope of the present invention is defined only by the appropriate features according to the claims in view of the explanations made above.

Although the present invention has been described above by reference to the embodiments, the present invention is not limited to the descriptions thereof, and it will be apparent to those skilled in the art that various modifications and improvements can be made.

One or more embodiments of the present invention may provide a cooling and heating air conditioner enabling a user to intuitionally recognize energy consumption even when the cooling and heating air conditioner is activated in an AUTO mode.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

3 COOLING AND HEATING AIR CONDITIONING CONTROLLER
4 COOLING AND HEATING AIR CONDITIONING UNIT
5 HEATING DEVICE
6 COOLING DEVICE
11 AUTO SWITCH (AUTO SETTING PORTION)
12 HEATER SWITCH (HEATER SETTING PORTION)
13 AIR CONDITIONING SWITCH (AIR CONDITIONING SETTING PORTION)
21 AUTO INDICATOR
22 HEATER INDICATOR
23 AIR CONDITIONING INDICATOR

The invention claimed is:

1. A cooling and heating air conditioner installed in an electric vehicle having a secondary battery, comprising:
    a cooling and heating air conditioning unit comprising:
        a cooling device that produces cooled air, and
        a heating device that produces heated air,
        wherein the cooling and heating air conditioning unit sends the cooled air produced by the cooling device or the heated air produced by the heating device to a vehicle interior;
    a cooling and heating air conditioning controller that sets the cooling and heating air conditioning unit to a cooling mode for sending the cooled air produced by the cooling device, a heating mode for sending the heated air produced by the heating device, or an AUTO mode for automatically selecting the cooling mode or the heating mode at least based on a temperature of the vehicle interior so as to control the cooling and heating air conditioning unit according to a set mode;
    an air conditioning setting portion that sets the cooling and heating air conditioning controller to the cooling mode;
    a heater setting portion that sets the cooling and heating air conditioning controller to the heating mode;
    an AUTO setting portion that sets the cooling and heating air conditioning controller to the AUTO mode;
    an air conditioning indicator that indicates an activated state of the cooling device;
    a heater indicator that indicates an activated state of the heating device; and
    an AUTO indicator that indicates a set state set by the AUTO setting portion,
    wherein the cooling device and the heating device are activated by electric energy from a driving battery of the electric vehicle,
    wherein the cooling and heating air conditioning controller directs the AUTO indicator to indicate the set state of the AUTO mode and directs the air conditioning indicator and the heater indicator to indicate the activated state of the cooling device and the heating device according to the set state of the AUTO mode when the AUTO mode is selected by the AUTO setting portion, and
    wherein the cooling and heating air conditioning unit carries out a dehumidification operation when the air conditioning indicator and the heater indicator indicate that the cooling device and the heating device are active, respectively.

2. The cooling and heating air conditioner according to claim 1, wherein the air conditioning setting portion, the heater setting portion, the AUTO setting portion, the air conditioning indicator, the heater indicator, and the AUTO indicator are formed in one switch panel.

3. The cooling and heating air conditioner according to claim 1, wherein the air conditioning setting portion, the heater setting portion and the AUTO setting portion are integrated with the air conditioning indicator, the heater indicator and the AUTO indicator, respectively.

4. The cooling and heating air conditioner according to claim 1,
wherein the heater setting portion is located on an upper side of the air conditioning setting portion,
wherein a temperature setting portion is provided adjacent to the heater setting portion and the air conditioning setting portion vertically aligned,
wherein a set temperature of the heating device or the cooling device increases when an upper portion of the temperature setting portion is pushed, and
wherein the set temperature of the heating device or the cooling device decreases when a lower portion of the temperature setting portion is pushed.

5. The cooling and heating air conditioner according to claim 1, wherein the cooling and heating air conditioning unit carries out a ventilation operation when the air conditioning indicator and the heater indicator indicate that the cooling device and the heating device are inactive, respectively.

6. A method of controlling a cooling and heating air conditioner installed in an electric vehicle having a secondary battery, including:
a cooling and heating air conditioning unit including a cooling device activated by electric energy from a driving battery of the electric vehicle to produce cooled air and a heating device activated by the electric energy from the driving battery to produce heated air, the cooling and heating air conditioning unit sending the cooled air produced by the cooling device or the heated air produced by the heating device to a vehicle interior;
an air conditioning setting portion that sets to a cooling mode for sending the cooled air produced by the cooling device;
a heater setting portion that sets to a heating mode for sending the heated air produced by the heating device;
an AUTO setting portion that sets to an AUTO mode for automatically selecting the cooling mode or the heating mode at least based on a temperature of the vehicle interior;
an air conditioning indicator that indicates an activated state of the cooling device;
a heater indicator that indicates an activated state of the heating device; and
an AUTO indicator that indicates a set state set by the AUTO setting portion, the method comprising:
setting the cooling and heating air conditioning unit to the cooling mode, the heating mode, or the AUTO mode, so as to control the cooling and heating air conditioning unit according to a set mode;
directing the AUTO indicator to indicate a set state of the AUTO mode and directing the air conditioning indicator and the heater indicator to indicate the activated state of the cooling device and the heating device according to the set state of the AUTO mode when the AUTO mode is selected by the AUTO setting portion; and
carrying out a dehumidification operation when the air conditioning indicator and the heater indicator indicate that the cooling device and the heating device are active, respectively.

7. The cooling and heating air conditioner according to claim 1, wherein the cooling and heating air conditioning controller releases the AUTO mode when the cooling and heating air conditioning unit carries out a dehumidification operation.

* * * * *